United States Patent [19]

Kervagoret

[11] Patent Number: 4,819,695

[45] Date of Patent: Apr. 11, 1989

[54] PRESSURE SERVO REGULATOR

[75] Inventor: Gilbert Kervagoret, Argenteuil, France

[73] Assignee: Bendix France, Drancy, France

[21] Appl. No.: 198,710

[22] Filed: May 18, 1988

Related U.S. Application Data

[63] Continuation of Ser. No. 64,920, Jun. 19, 1987, abandoned.

[51] Int. Cl.⁴ ............................................. F15B 13/044
[52] U.S. Cl. ............................ 137/625.65; 137/116.3; 180/142; 251/129.11
[58] Field of Search ........... 137/625.65, 116.3, 505.14; 180/142; 251/129.11, 129.12, 129.13

[56] References Cited

U.S. PATENT DOCUMENTS

| | | | |
|---|---|---|---|
| 2,503,563 | 4/1950 | Ray | 251/129.11 X |
| 3,227,172 | 1/1966 | Sims et al. | 137/116.3 |
| 3,698,415 | 10/1972 | Forster et al. | 137/102 |
| 3,756,282 | 9/1973 | Knutson | 137/625.64 |
| 4,184,512 | 1/1980 | Pignolet | 137/628.68 X |
| 4,216,841 | 8/1980 | Ohtuka et al. | 180/141 |
| 4,239,179 | 12/1980 | Geier | 251/129.11 X |
| 4,265,270 | 5/1981 | Satoh | 251/129.12 X |
| 4,342,335 | 8/1982 | Reinicker et al. | 137/636.2 |
| 4,370,856 | 2/1983 | Ito et al. | 60/389 |
| 4,428,398 | 1/1984 | Mito et al. | 251/129.13 X |
| 4,548,383 | 10/1985 | Wolfges | 137/625.65 X |
| 4,570,736 | 2/1986 | Waldorf | 180/143 |
| 4,650,159 | 3/1987 | Shimamura | 251/129.11 X |

FOREIGN PATENT DOCUMENTS 0093416 11/1983 European Pat. Off. .

Primary Examiner—Gerald A. Michalsky
Attorney, Agent, or Firm—Larry J. Palguta; Ken C. Decker

[57] ABSTRACT

Hydraulic pressure servo-regulator, intended to provide a hydraulic fluid pressure corresponding to a given electrical signal, comprising an electromechnical device (10) connected to a valve mechanism (12) of a high-pressure fluid circuit (38), characterized in that the electromechanical device (10) comprises a geared motor, the valve mechanism (12) comprising a spool valve (44) connected to the geared motor (10) by way of a spring (58).

3 Claims, 1 Drawing Sheet

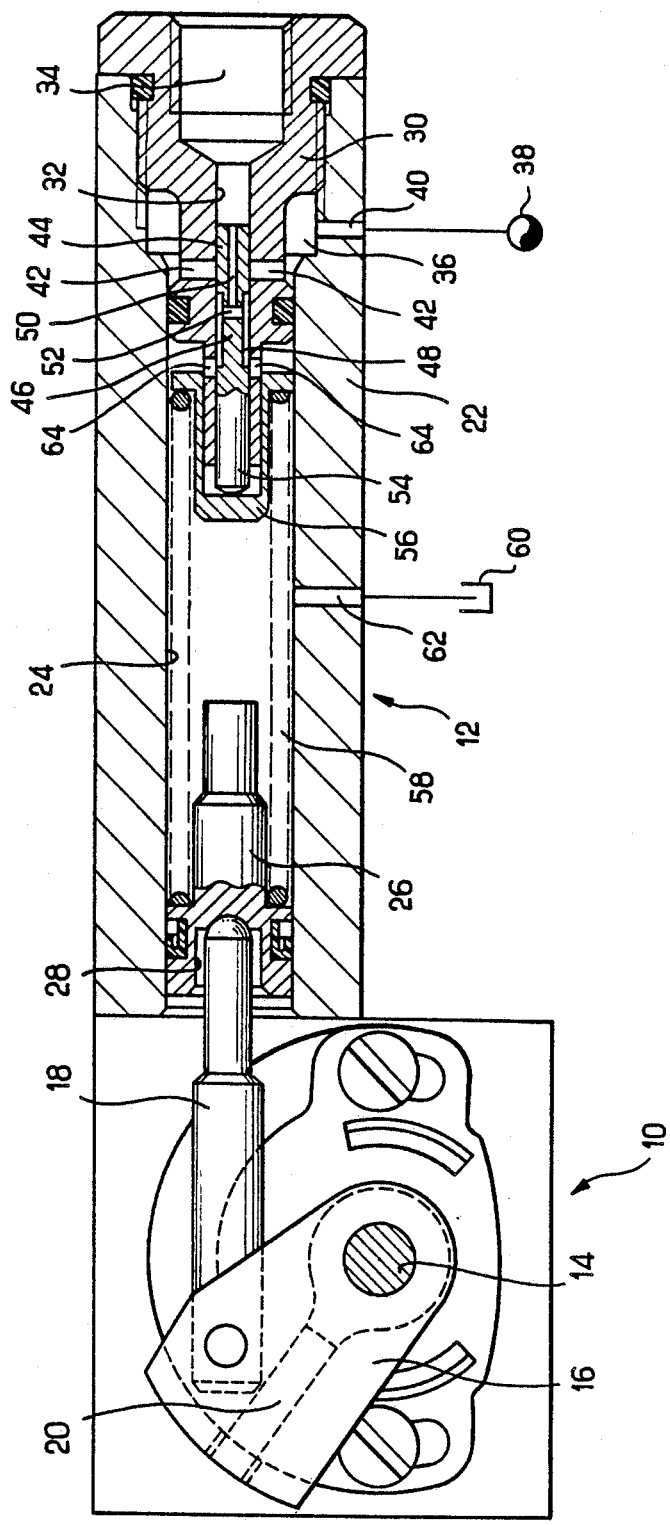

PRESSURE SERVO REGULATOR

This is a continuation of abandoned application Ser. No. 064,920 filed 6-19-87 now abandoned.

The present invention concerns pressure servo-regulators for hydraulic installations, in particular for the power-assisted steering of vehicles.

In the hydraulic power-assisted steering system of a vehicle, it is desirable to modify the working pressure in accordance with the speed of the vehicle so as to regulate selectively the degree of power assistance.

For example, at low speeds, when parking, the driver requires maximum power assistance, while, at high speeds, he requires only a small degree of power assistance.

It is also desirable to modify the degree of power assistance in accordance with the load of the vehicle.

The document U.S. Pat. No. 4,216,841 describes devices associated with the power-assisted steering of a vehicle and intended to vary the pressure of the hydraulic working fluid supplied to the power-assisted steering in accordance with the speed of the vehicle and the load, respectively.

An aim of the present invention is to provide a pressure servo-regulator capable of supplying an output pressure which varies in accordance with at least one electrical signal which is a function of the speed or the load of the vehicle, in the form of a simple arrangement which is reliable and inexpensive to manufacture.

According to the present invention there is provided a hydraulic pressure servo-regulator, intended to supply a hydraulic fluid pressure corresponding to a given electrical signal, comprising an electromechnical device connected to a valve means of a high-pressure fluid circuit, characterized in that the electromechnical device comprises a geared motor, the valve means comprising a spool valve connected to the geared motor by means of a spring.

The invention will now be described by way of example with reference to the accompanying drawings in which:

The sole FIGURE is a partial longitudinal section of a pressure servo-regulator according to the present invention.

As shown in the FIGURE, a pressure servo-regulator comprises an electric motor 10 and a high-pressure valve 12. The electric motor 10, which in the example shown is a geared motor, comprises a shaft 14 to which there is fixed a lever 16 on which there is pivotably mounted a push-rod 18.

The shaft 14 is connected to a spindle of a recopying potentiometer (not shown) for example by means of an actuating arm 20 fixed to the lever 16. The spindle of the potentiometer is aligned with that of the motor 10.

The high-pressure valve 12 comprises a body 22 with a stepped longitudinal bore 24. A piston 26 is sealingly and slidably mounted inside the bore 24 and has an opening 28 inside which the free end of the push-rod 18 is accommodated. A closure member 30 is fixedly mounted inside the bore 24 and comprises a longitudinal bore 32 connected to an outlet orifice 34 intended to be connected to a hydraulic power-assisted steering device (not shown). An annular space 36, defined between the bore 24 and the closure member 30, is connected to a pressurized hydraulic fluid source 38 by an opening 40 in the body 22 and, within the bore 32, by two openings 42 in a closure member 30. Inside the bore 32 there is sealingly and slidably mounted a spool valve 44, a part 46 of which, having a smaller cross-section, defines an annular space 48 with the bore 32. A longitudinal bore 50 communicates with the annular space 48 via a transverse opening 52. One end 54 of the spool valve 44 projects outside the bore 32 and bears against the inside of a cage 56 slidably mounted on the closure member 30. The cage 56 is connected to the piston 26 by a spring 58. The bore 24 hydraulically communicates with a low pressure reservoir 60 via a passage 62 in the body 22. In the rest position of the device, as shown, the bore 24 hydraulically communicates with the bore 32 of the closure member 30 via two lateral openings 64 overlapping with the annular space 48 of the slide 44, and thus establishes a passage between the low-pressure reservoir 60 and the outlet 34 by means of the longitudinal bore 50.

The device thus described operates as follows: in response to an electrical signal which may be a function of the speed or the load of the vehicle, or a combination of the two, the electric motor turns through an angle corresponding to the electrical signal. Since the potentiometer is incorporated in a conventional recopying circuit, it reduces and cancels out the potential applied to the motor in accordance with rotation of the shaft 14. The motor 10, and thus the lever 16, therefore assume a given position corresponding to the electrical signal received by the motor.

Clockwise rotation of the lever 16 (when viewing the drawing) causes displacement of the push-rod 18 to the right, which displaces the first piston 26, thereby compressing the spring 58. The action of the spring 58 on the cage 56 causes displacement of the spool valve 44, and the part 46 with a smaller cross-section first closes the passage between the low-pressure reservoir 60 and the outlet 34 and then, if displacement continues, opens the passage between the high-pressure source 38 and the outlet 34. The hydraulic pressure inside the bore 32 exerts a counter-pressure which opposes displacement of the spool valve and, thus a given rotation of the lever 16 creates a corresponding hydraulic pressure at the outlet 34. Similarly, if the electrical signal causes rotation of the electric motor in an anticlockwise direction (when viewing the drawing), displacement of the push-rod 18 to the left causes closure of the passage between the high-pressure source 38 and the outlet 34 and opens the passage leading to the low-pressure reservoir 60, so that the hydraulic pressure at the outlet 34 falls.

Since the geared motor 10 is mechanically irreversible, a force applied to the shaft 14 cannot cause rotation of the motor. In the event of failure of the electric circuit, the motor 10, and thus the spool valve 44, remain in their previously defined position. An electrical failure does not produce a sudden change in the behavior of the power-assisted steering.

I claim:

1. A hydraulic pressure servo-regulator, intended to supply a hydraulic fluid at a pressure corresponding to the magnitude of a given electrical signal, the servo-regulator comprising valve means which includes a first bore provided longitudinally and connected with a low pressure fluid reservoir, a closure member closing said first bore and having a second bore coaxial with said first bore and connected with a fluid pressure outlet, said closure member being provided with at least one lateral opening communicating with said first bore and with at least one lateral opening communicating with a high pressure fluid source, piston means mounted slidably inside said first bore, a spool valve mounted slidably in said second bore and having a recessed annular portion defining, with said second bore, an annular space which communicates with said fluid pressure outlet, the length of said annular portion being less than the distance between said lateral openings provided in said closure member in order that the annular space may communicate selectively with one of the lateral opening communicating with said first bore and the lateral opening communicating with said high pressure fluid source, and a spring connecting said piston means to said spool valve, and an electromechanical device comprising a geared motor having a shaft to which is fixed a lever on which is pivotably mounted a push-rod for displacing said piston means into said first bore.

2. The servo-regulator in accordance with claim 1, wherein the spring bears against a cage member mounted slidably on the closure member and engaging said spool valve in order to effect displacement thereof.

3. The servo-regulator in accordance with claim 2, wherein the push-rod may displace the piston means, spring, and cage member so that the cage member closes the lateral opening communicating with said first bore.

* * * * *